United States Patent
Song et al.

(10) Patent No.: US 11,067,846 B2
(45) Date of Patent: Jul. 20, 2021

(54) COLOR FILTER SUBSTRATE AND FABRICATING METHOD THEREOF, DISPLAY PANEL

(71) Applicant: BOE TECHNOLOGY GROUP CO., LTD., Beijing (CN)

(72) Inventors: Zhen Song, Beijing (CN); Guoying Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/456,345

(22) Filed: Jun. 28, 2019

(65) Prior Publication Data

US 2020/0012145 A1   Jan. 9, 2020

(30) Foreign Application Priority Data

Jul. 3, 2018   (CN) .......................... 201810717907.8

(51) Int. Cl.
*G02F 1/1335* (2006.01)
*G02F 1/1343* (2006.01)

(52) U.S. Cl.
CPC .... *G02F 1/133516* (2013.01); *G02F 1/13439* (2013.01); *G02F 1/133512* (2013.01); *G02F 1/134336* (2013.01)

(58) Field of Classification Search
CPC ......... G02F 1/133516; G02F 1/133512; G02F 1/133514; G02F 1/134336; G02F 1/13439; G02F 2001/136218
See application file for complete search history.

(56) References Cited

U.S. PATENT DOCUMENTS

| | | | |
|---|---|---|---|
| 2010/0103121 A1* | 4/2010 | Kim ....................... | G06F 3/0412 345/173 |
| 2015/0268521 A1* | 9/2015 | Daishi ............... | G02F 1/134309 349/123 |
| 2015/0277186 A1* | 10/2015 | Zou ......................... | G06F 3/044 345/174 |
| 2017/0160605 A1* | 6/2017 | Park .................. | G02F 1/134363 |
| 2018/0321547 A1* | 11/2018 | Li ...................... | G02F 1/136286 |
| 2019/0179367 A1* | 6/2019 | Mathew .............. | G02F 1/13306 |

FOREIGN PATENT DOCUMENTS

| CN | 105467665 A | 4/2016 |
|---|---|---|
| CN | 107369777 A | 11/2017 |

OTHER PUBLICATIONS

First office action dated Mar. 13, 2020 for application No. CN201810717907.8 with English translation attached.
Second Office Action dated Oct. 27, 2020 corresponding to Chinese application No. 201810717907.8.

* cited by examiner

*Primary Examiner* — Nathanael R Briggs
(74) *Attorney, Agent, or Firm* — Nath, Goldberg & Meyer; Joshua B. Goldberg

(57) ABSTRACT

The present disclosure provides a color filter substrate and a fabricating method thereof, and a display panel. The method includes: forming a black matrix on a base substrate; forming an auxiliary electrode on a side of the black matrix away from the base substrate, an orthographic projection of the black matrix on the base substrate covering an orthographic projection of the auxiliary electrode on the base substrate; and forming color filters on the base substrate and in a space defined by the black matrix on which the auxiliary electrode is formed.

10 Claims, 3 Drawing Sheets

COLOR FILTER SUBSTRATE AND FABRICATING METHOD THEREOF, DISPLAY PANEL

CROSS-REFERENCE TO RELATED APPLICATION

This application claims priority to Chinese Patent Application No. 201810717907.8, filed on Jul. 3, 2018, the entire contents of which are hereby incorporated by reference.

TECHNICAL FIELD

The present disclosure relates to the field of display technology, and particularly, relates to a color filter substrate and a method of fabricating the same, and a display panel.

BACKGROUND

An existing color filter substrate includes a transparent base substrate, a plurality of color filters, a dielectric layer, a metal electrode and a black matrix between adjacent color filters. The dielectric layer is generally disposed between the color filters and the metal electrode to separate the color filters from the metal electrode.

SUMMARY

In an aspect, the present disclosure provides a method of fabricating a color filter substrate, including: forming a black matrix on a base substrate; forming an auxiliary electrode on a side of the black matrix away from the base substrate, an orthographic projection of the black matrix on the base substrate covering an orthographic projection of the auxiliary electrode on the base substrate; and forming color filters on the base substrate and in a space defined by the black matrix on which the auxiliary electrode is formed.

In some embodiments, prior to forming the auxiliary electrode on the side of the black matrix away from the base substrate, the method further includes forming spacers on the side of the black matrix away from the base substrate. The auxiliary electrode is formed on a side of the spacers away from the black matrix, and the orthographic projection of the auxiliary electrode on the base substrate completely covers orthographic projections of the spacers on the base substrate.

In some embodiments, the orthographic projection of the auxiliary electrode on the base substrate does not overlap orthographic projections of the color filters on the base substrate.

In some embodiments, the orthographic projection of the auxiliary electrode on the base substrate completely overlaps the orthographic projection of the black matrix on the base substrate.

In some embodiments, a material of the auxiliary electrode includes a material selected from copper, silver, manganese, aluminum, manganese niobium, or aluminum niobium.

In some embodiments, the color filters include color filters of three colors of red, green and blue, and any two adjacent color filters of the color filters have different colors.

In some embodiments, forming the spacers on the side of the black matrix away from the base substrate includes: forming a layer of spacer material on the side of the black matrix away from the base substrate; and patterning the layer of spacer material to form the spacers on the black matrix at a certain density.

As another aspect, the present disclosure further provides a color filter substrate, including: a base substrate; a black matrix on the base substrate; an auxiliary electrode on a side of the black matrix away from the base substrate, an orthographic projection of the black matrix on the base substrate covering an orthographic projection of the auxiliary electrode on the base substrate; and color filters on the base substrate and in a space defined by the black matrix on which the auxiliary electrode is disposed.

In some embodiments, the color filter substrate further includes spacers on the side of the black matrix away from the base substrate. The auxiliary electrode is on a side of the spacers away from the black matrix, and the orthographic projection of the auxiliary electrode on the base substrate completely covers orthographic projections of the spacers on the base substrate.

In some embodiments, the orthographic projection of the auxiliary electrode on the base substrate does not overlap orthographic projections of the color filters on the base substrate.

In some embodiments, the orthographic projection of the auxiliary electrode on the base substrate completely overlaps the orthographic projection of the black matrix on the base substrate.

In some embodiments, a material of the auxiliary electrode includes a material selected from copper, silver, manganese, aluminum, manganese niobium, or aluminum niobium.

In some embodiments, the color filters include color filters of three colors of red, green and blue, and any two adjacent color filters of the color filters have different colors.

As another aspect, the present disclosure further provides a display panel including the color filter substrate described herein.

In some embodiments, the display panel is an OLED panel, the OLED panel further includes an array substrate, and the auxiliary electrode of the color filter substrate is electrically coupled to a cathode of an OLED device of the array substrate.

DETAILED DESCRIPTION

To make those skilled in the art better understand the technical solutions of the present disclosure, the present disclosure will be described in detail below in conjunction with the accompanying drawings and specific implementations.

Figure 1:
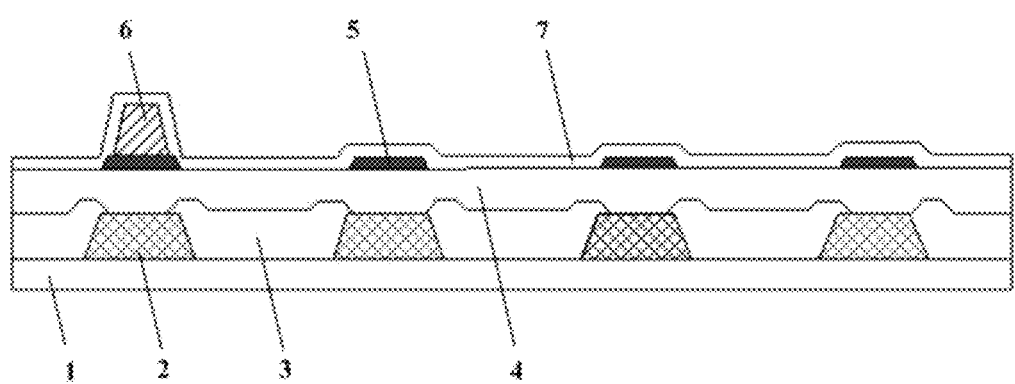
FIG. 1 is a schematic diagram illustrating a structure of a conventional color filter substrate.

FIG. 1 is a schematic diagram illustrating a structure of a conventional color filter substrate. The color filter substrate includes a transparent base substrate 1, a black matrix 2, color filters 3, a dielectric layer 4, an auxiliary electrode 5, spacers 6, and a metal electrode 7. The color filters 3 include a plurality of color filters 3 disposed on the transparent substrate 1, and the black matrix 2 is disposed between adjacent color filters 3. The dielectric layer 4 is disposed between the color filters 3 and the metal electrode 7, and configured to separate the color filters 3 from the metal electrode 7, thereby preventing the color filters 3 from being scratched by the metal electrode 7. Generally, however, the dielectric layer 4 has a large thickness, and thus the dielectric layer 4 may filter out a small portion of light emitted from a light emitting layer before transmitting the light to surfaces of the color filters 3, thereby reducing brightness of a display panel having the color filter substrate including the dielectric layer 4. Moreover, a display panel formed by assembling a counter substrate and the color filter substrate including the dielectric layer 4 having a large thickness has a large cell thickness, so light emitted from a sub-pixel may be emitted into a color filter area of an adjacent sub-pixel, causing display mora. Further, since the dielectric layer 4 is made of an organic material, particles having a large size may exist in the dielectric layer 4 when the dielectric layer 4 is fabricated as a whole layer on the surfaces of the color filters 3. The metal electrode 7, which are formed subsequently on the surface of the dielectric layer 4, may be scratched by the particles, resulting in a short circuit in the display panel including the color filter substrate and black dots in some regions of the display panel (i.e., these regions cannot perform display), thereby degrading the display performance of the display panel. Also, gas may be discharged from these particles at high temperature, and continuously impact the inside of the display panel to break the display panel, thereby reducing the yield of the display panel.

Figure 2:
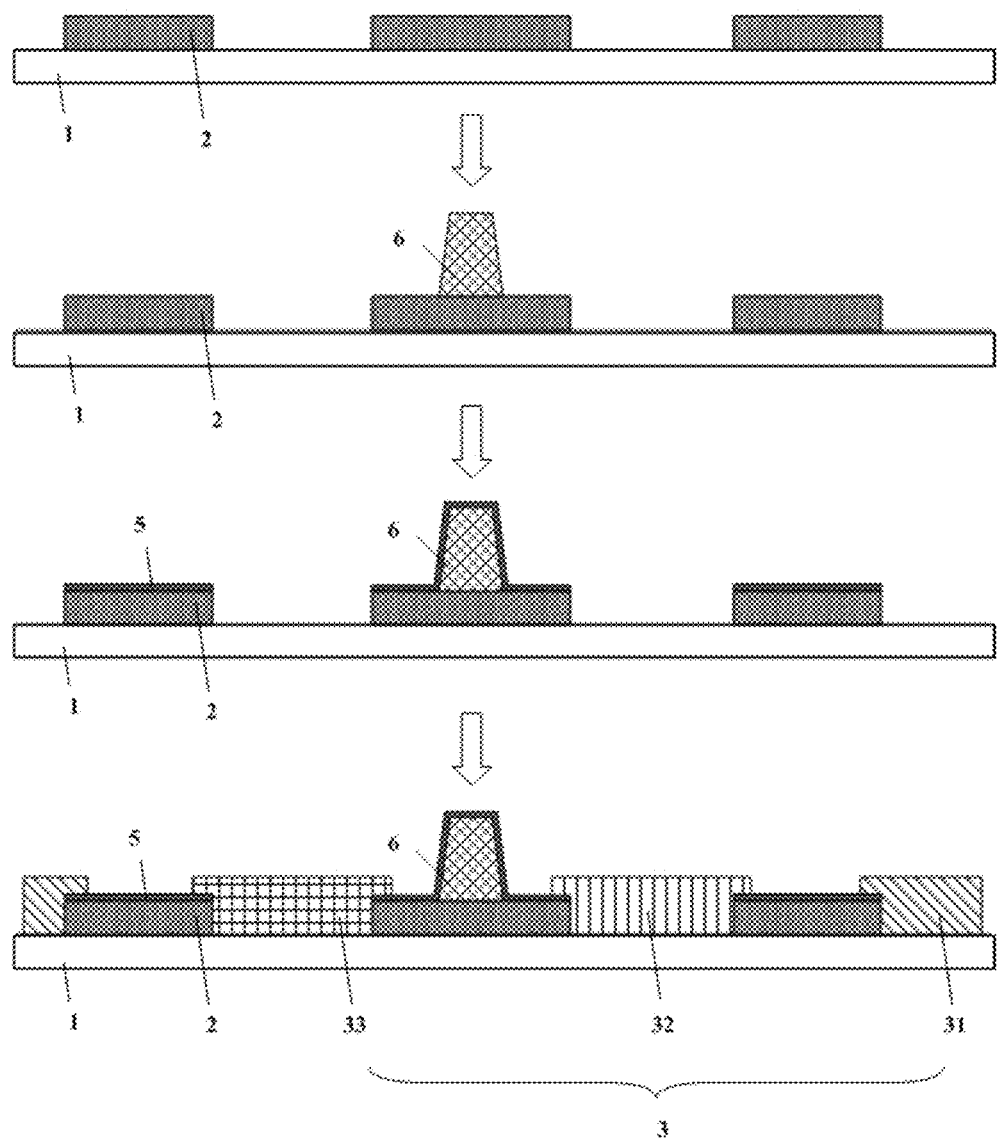
FIG. 2 is a flow chart of a method of fabricating a color filter substrate according to an embodiment of the present disclosure.

In view of the above problems, an embodiment of the present disclosure provides a method of fabricating a color filter substrate including steps S0 to S3 as shown in FIG. 2.

In step S0, a base substrate 1 is cleaned to keep the base substrate 1 clean. A pattern of a black matrix 2 is formed on the base substrate 1 through a patterning process.

First, a layer of black matrix material is applied on the base substrate 1; and then an etching process is performed on the layer of black matrix material to form a patterned black matrix 2. It can be understood that the process of forming the patterned black matrix 2 on the base substrate 1 is not limited to the above process and is not limited in the present disclosure.

In step S1, a pattern of spacers 6 is formed on a side of the black matrix 2 away from the base substrate 1. In some embodiments, the spacers 6 are formed on a side of a part of the black matrix 2 away from the base substrate 1.

First, a layer of spacer material is applied on the black matrix 2, and then an etching process is performed on the layer of spacer material to form the spacers 6 on the black matrix 2 at a certain density. It can be understood that the process of forming the spacers 6 on the black matrix 2 is not limited to the above process and is not limited in the present disclosure.

The density of the spacers 6 distributed on the black matrix 2 may be determined based on the number of the color filters 3. For example, one spacer 6 may be formed on the black matrix 2 for every five color filters 3.

In step S2, an auxiliary electrode 5 is formed.

First, a layer of auxiliary electrode 5 may be applied on a side of the black matrix 2 and the spacers 6 away from the base substrate 1, e.g., through a sputtering process. Further, in order to prevent the color filters 3 from being scratched by the formed auxiliary electrode 5 in the subsequent process of forming the color filters 3 of the color filter substrate, it is also required to perform an etching process on the layer of auxiliary electrode 5, such that an orthographic projection of the black matrix 2 on the base substrate 1 covers an orthographic projection of the auxiliary electrode 5 on the base substrate 1. In some embodiments, the orthographic projection of the auxiliary electrode 5 on the base substrate 1 completely overlaps the orthographic projection of the black matrix 2 on the base substrate 1.

In some embodiments, the orthographic projection of the auxiliary electrode 5 on the base substrate 1 completely covers orthographic projections of the spacers 6 on the base substrate 1. In this case, as shown in FIG. 2, the auxiliary electrode 5 formed through a patterning process completely covers side surfaces and a top surface of the spacer 6. As such, it is possible to prevent the spacer 6 from falling off in the subsequent processes. On the other hand, the auxiliary electrode 5 formed on the spacers 6 can be directly and electrically coupled to a cathode of an OLED device of an array substrate. As such, the process of forming the metal electrode 7 (e.g., indium tin oxide, see FIG. 1) on the surfaces of the spacers 6 for electrically coupling the fabricated color filter substrate and the array substrate in the prior art can be omitted, so that the time for fabricating the color filter substrate is shortened and the fabrication cost is reduced.

In some embodiments, a material of the auxiliary electrode 5 includes a metal, and the metal may be, for example, any one of copper, silver, manganese, aluminum, manganese niobium, and aluminum niobium. It can be understood that the material of the auxiliary electrode 5 is not limited to these materials and is not listed here one by one.

In step S3, a pattern of the color filters 3 is formed, through a patterning process, on the base substrate 1 and in a space defined by the black matrix 2 on which the auxiliary electrode 5 is formed. As shown in FIG. 2, the color filters 3 are formed between adjacent portions of the black matrix 2.

In some embodiments, the color filters 3 includes color filters of three colors of red, green and blue, and any two adjacent color filters of the color filters 3 have different colors.

For example, a red color filter 31, a green color filter 32 and a blue color filter 33 are sequentially formed, through a sputtering process, on the base substrate 1 subjected to step S2 and in the space defined by the black matrix 2.

In some embodiments, the orthographic projection of the auxiliary electrode 5 on the base substrate 1 does not overlap orthographic projections of the color filters 3 on the base substrate 1.

At this point, the fabrication of the color filter substrate is finished.

To sum up, in the method of fabricating the color filter substrate according to the embodiment of the present disclosure, the color filters 3 are formed on the base substrate 1 after the auxiliary electrode 5 is formed. As such, in the method according to the embodiment of the present disclosure, it is not necessary to provide the dielectric layer for separating the color filters 3 from the auxiliary electrode 5 in order to prevent the color filters 3 from being scratched by the auxiliary electrode 5 during the fabrication process, as a result, the fabrication process of the color filter substrate is simplified, the fabrication cost is reduced, and other problems caused by the presence of the dielectric layer are avoided.

Figure 3:
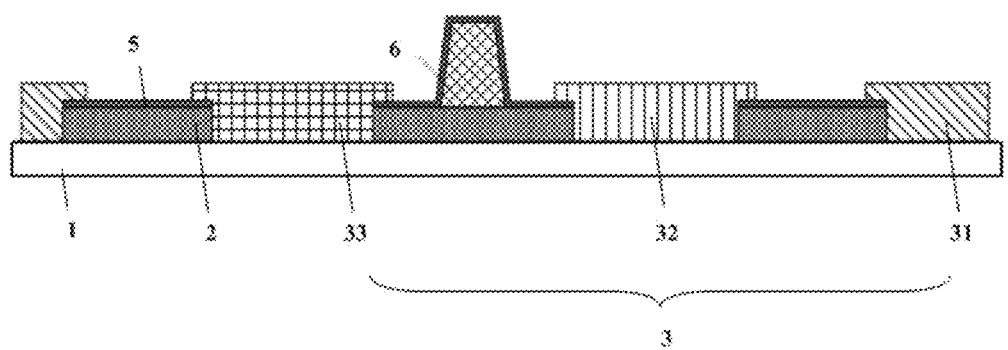
FIG. 3 is a schematic diagram illustrating a structure of a color filter substrate according to an embodiment of the present disclosure.

FIG. 3 is a schematic diagram illustrating a structure of a color filter substrate according to an embodiment of the present disclosure.

The color filter substrate according to the present embodiment may be fabricated by using the method according to the embodiment of the present disclosure.

As shown in FIG. 3, the embodiment of the present disclosure provides a color filter substrate, including: a base substrate 1; a black matrix 2 on the base substrate 1; an auxiliary electrode 5 on a side of the black matrix 2 away from the base substrate 1, an orthographic projection of the black matrix 2 on the base substrate 1 covering an orthographic projection of the auxiliary electrode 5 on the base substrate 1; and color filters 3 on the base substrate 1 and in a space defined by the black matrix 2 on which the auxiliary electrode 5 is disposed. In some embodiments, the color filter substrate further includes spacers 6 on the side of the black matrix 2 away from the base substrate 1. The auxiliary electrode 5 is on a side of the spacers 6 away from the black matrix 2, and the orthographic projection of the auxiliary electrode 5 on the base substrate 1 completely covers orthographic projections of the spacers 6 on the base substrate 1. In some embodiments, the orthographic projection of the auxiliary electrode 5 on the base substrate 1 completely overlaps the orthographic projection of the black matrix 2 on the base substrate 1.

In order to prevent the color filters 3 from being scratched by the auxiliary electrode 5 which is made of a metal material, in some embodiments, the orthographic projection of the auxiliary electrode 5 on the base substrate 1 does not overlap orthographic projections of the color filters 3 on the base substrate 1, such that the contact area between the auxiliary electrode 5 and the color filters 3 is minimized.

The auxiliary electrode 5 may be directly and electrically coupled to a cathode of an OLED device of an array substrate. As such, the process of forming the metal electrode 7 (e.g., indium tin oxide, see FIG. 1) on the surfaces of the spacers 6 for electrically coupling the color filter substrate and the array substrate in the prior art can be omitted, so that the time for fabricating the color filter substrate is shortened and the fabrication cost is reduced.

To sum up, the color filter substrate according to the embodiment of the present disclosure is not provided with the dielectric layer, so problems (e.g., reduced display brightness, display mura, breakage of display panel and the like) caused by the dielectric layer having a large thickness in the prior art can be solved.

The present disclosure further provides a display panel including the color filter substrate described herein. In a case where the display panel in the embodiments of the present disclosure is an OLED display panel, the auxiliary electrode 5 of the color filter substrate is electrically coupled to the OLED device of the array substrate. As such, the process of forming the metal electrode 7 (e.g., indium tin oxide, see, FIG. 1) on the surfaces of the spacers 6 for electrically coupling the color filter substrate and the array substrate in the prior art can be omitted, so that the time for fabricating the color filter substrate is shortened and the fabrication cost is reduced.

Since the display panel of the embodiments of the present disclosure includes the color filter substrate described herein, the display performance of the display panel is improved.

It is to be understood that the above embodiments are merely exemplary embodiments for the purpose of explaining the principles of the present disclosure, but the present disclosure is not limited thereto. Various modifications and improvements can be made by those skilled in the art without departing from the spirit and scope of the present disclosure. These modifications and improvements are also considered to be within the protection scope of the present disclosure.

What is claimed is:

1. A method of fabricating a color filter substrate, comprising:
   forming a black matrix on a base substrate;
   forming spacers on a side of the black matrix away from the base substrate;
   forming an auxiliary electrode on a side of the spacers away from the black matrix, an orthographic projection of the black matrix on the base substrate covering an orthographic projection of the auxiliary electrode on the base substrate, and the orthographic projection of the auxiliary electrode on the base substrate completely covering orthographic projections of the spacers on the base substrate; and
   forming color filters on the base substrate and in a space defined by the black matrix, after the auxiliary electrode is formed,
   wherein the orthographic projection of the auxiliary electrode on the base substrate and the orthographic projection of the black matrix on the base substrate completely overlap each other.

2. The method of claim 1, wherein the orthographic projection of the auxiliary electrode on the base substrate does not overlap orthographic projections of the color filters on the base substrate.

3. The method of claim 1, wherein a material of the auxiliary electrode comprises a material selected from copper, silver, manganese, aluminum, manganese niobium, or aluminum niobium.

4. The method of claim 1, wherein the color filters comprise color filters of three colors of red, green and blue, and any two adjacent color filters of the color filters have different colors.

5. The method of claim 1, wherein forming the spacers on the side of the black matrix away from the base substrate comprises:
   forming a layer of spacer material on the side of the black matrix away from the base substrate; and
   patterning the layer of spacer material to form the spacers on the black matrix at a certain density.

6. A color filter substrate, comprising:
   a base substrate;
   a black matrix on the base substrate;
   spacers on a side of the black matrix away from the base substrate;
   an auxiliary electrode on a side of the spacers away from the black matrix, an orthographic projection of the black matrix on the base substrate covering an orthographic projection of the auxiliary electrode on the base substrate, and the orthographic projection of the auxiliary electrode on the base substrate completely covering orthographic projections of the spacers on the base substrate; and
   color filters on the base substrate and in a space defined by the black matrix on which the auxiliary electrode is disposed,
   wherein the orthographic projection of the auxiliary electrode on the base substrate does not overlap orthographic projections of the color filters on the base substrate, and the orthographic projection of the auxiliary electrode on the base substrate and the orthographic projection of the black matrix on the base substrate completely overlap each other.

7. The color filter substrate of claim 6, wherein a material of the auxiliary electrode comprises a material selected from copper, silver, manganese, aluminum, manganese niobium, or aluminum niobium.

8. The color filter substrate of claim 6, wherein the color filters comprise color filters of three colors of red, green and blue, and any two adjacent color filters of the color filters have different colors.

9. A display panel, comprising the color filter substrate of claim 6.

10. The display panel of claim 9, wherein the display panel is an OLED panel, the OLED panel further comprises an array substrate, and the auxiliary electrode of the color filter substrate is electrically coupled to a cathode of an OLED device of the array substrate.

* * * * *